(12) United States Patent
Yokota

(10) Patent No.: US 7,753,407 B2
(45) Date of Patent: Jul. 13, 2010

(54) SIDE AIRBAG APPARATUS WITH SIDE AIRBAG COVER

(75) Inventor: Masatoshi Yokota, Tokyo (JP)

(73) Assignee: Takata Corporation, Tokyo (JP)

( * ) Notice: Subject to any disclaimer, the term of this patent is extended or adjusted under 35 U.S.C. 154(b) by 85 days.

(21) Appl. No.: 12/153,923

(22) Filed: May 28, 2008

(65) Prior Publication Data

US 2009/0079169 A1    Mar. 26, 2009

(30) Foreign Application Priority Data

Sep. 20, 2007    (JP) .............................. 2007-243410

(51) Int. Cl.
*B60R 21/16* (2006.01)
(52) U.S. Cl. .............. 280/743.2; 280/728.2; 280/728.3; 280/730.2; 280/743.1
(58) Field of Classification Search ... 280/728.1–728.3, 280/730.2, 743.1, 743.2
See application file for complete search history.

(56) References Cited

U.S. PATENT DOCUMENTS

| | | | |
|---|---|---|---|
| 6,131,944 A * | 10/2000 | Henkel et al. ............ | 280/728.3 |
| 6,206,409 B1 * | 3/2001 | Kato et al. ................ | 280/728.2 |
| 6,237,936 B1 * | 5/2001 | Quade et al. .............. | 280/730.2 |
| 6,371,510 B1 * | 4/2002 | Marriott et al. ........... | 280/730.1 |
| 6,585,292 B2 * | 7/2003 | Abe et al. ................. | 280/743.1 |
| 7,125,043 B2 * | 10/2006 | Amamori ................... | 280/743.1 |
| 7,370,880 B2 * | 5/2008 | Hasebe ....................... | 280/729 |
| 7,597,343 B2 * | 10/2009 | Miwa et al. ............... | 280/728.2 |
| 2007/0241541 A1 * | 10/2007 | Miwa et al. ............... | 280/728.2 |
| 2009/0051148 A1 * | 2/2009 | Osterhout ................. | 280/728.3 |

FOREIGN PATENT DOCUMENTS

JP    H10-244895    9/1998

* cited by examiner

*Primary Examiner*—Faye M. Fleming
*Assistant Examiner*—James English
(74) *Attorney, Agent, or Firm*—Manabu Kanesaka

(57) ABSTRACT

A side airbag cover for holding a folded shape of a side airbag to be stored includes a first cover portion for covering a front inflation portion of the side airbag, the front inflation portion inflating and deploying substantially forward in a longitudinal direction of a vehicle; and a second cover portion for covering a lower inflation portion of the side airbag, the lower inflation portion inflating and deploying substantially downward.

5 Claims, 4 Drawing Sheets

SIDE AIRBAG APPARATUS WITH SIDE AIRBAG COVER

BACKGROUND OF THE INVENTION AND RELATED ART STATEMENT

The present invention relates to a side airbag apparatus with a side airbag cover for preventing the side airbag for restraining an occupant upon the side collision of the vehicle and the like from being inappropriately folded when it is stored in a casing.

The side airbag apparatus which allows an inflator to inflate the side airbag to the side of the occupant so as to be restrained thereby upon the side collision or rollover of the vehicle has been known. The aforementioned side airbag apparatus is built in a back portion of the seat, for example, and allows the side airbag to be inflated and deployed by the gas ejected from the inflator from the back portion between the occupant and the side wall of the vehicle body.

The aforementioned side airbag is generally folded to be stored in the casing built in the back portion of the seat. In order to maintain the folded shape of the airbag, the folded airbag is covered with the airbag cover so as to be stored in the casing.

The above-structured side airbag cover has been known as disclosed in Japanese Unexamined Patent Application Publication No. 10-244895 (Patent Document 1).

A basic structure of the side airbag cover used for storing the side airbag in the folded state has been disclosed in the above prior art. The optimization of the side airbag cover demands an improvement of the airbag deployment stability as well as reduction in the amount of the base fabric required for forming the cover.

Accordingly, an object of the present invention is to provide a side airbag cover which improves the side airbag deployment stability while reducing the amount of the base fabric required for forming the cover, and the side airbag apparatus employing the side airbag cover.

Further objects and advantages of the invention will be apparent from the following description of the invention.

SUMMARY OF THE INVENTION

In the first aspect of the present invention, a side airbag cover for holding a folded shape of a side airbag to be stored, which inflates and deploys between a side wall portion of a body of a vehicle and an occupant seated in a seat disposed inside the body of the vehicle, includes a first cover portion for covering a front inflation portion of the side airbag, which inflates and deploys mainly forward in a longitudinal direction of the vehicle, and a second cover portion for covering a lower inflation portion of the side airbag, which inflates and deploys mainly downward.

In the first invention, generally, the side airbag is stored in the casing built in the back portion of the seat in the folded state. The airbag in the folded state is covered with the airbag cover while holding the folded shape so as to be stored in the casing.

In the first aspect of the invention, the side airbag cover includes the first cover portion for covering the front inflation portion of the side airbag, which inflates and deploys mainly forward in the longitudinal direction of the vehicle, and the second cover for covering the lower inflation portion of the side airbag, which inflates and deploys mainly downward. This configuration can make the covered area smaller than that in a case where the side airbag is entirely covered with the side airbag cover. Accordingly, the force required for tearing the airbag cover upon the inflation and deployment of the airbag may be reduced. As a result, the side airbag deployment stability may be improved. As the covered area can be reduced, the amount of the base fabric required for forming the airbag cover can be reduced. This configuration further makes it possible to reduce the package capacity in a state where the side airbag is covered with the side airbag cover.

In the second aspect of the invention, each of the first and the second cover portions has a tear portion which is torn upon the inflation and deployment of the side airbag.

Upon the inflation and deployment of the side airbag, the tear portion of the first cover portion is torn so that the front inflation portion of the side airbag is smoothly inflated and deployed, and the tear portion of the second cover portion is torn so that the lower inflation portion of the side airbag is smoothly inflated and deployed. Therefore, it is possible to improve the side airbag deployment stability.

In the third aspect of the invention, according to the second aspect, the first cover portion includes the tear portion at a front end portion in a state where the front inflation portion is covered, and the second cover portion includes the tear portion at a lower end portion in a state where the lower inflation portion is covered.

In this way, the tear portion on the front end of the first cover portion is torn upon the inflation and deployment of the side airbag to allow the front inflation portion of the side airbag to smoothly inflate and deploy forward. Then, the tear portion on the lower end of the second cover portion is torn to allow the lower inflation portion of the side airbag to smoothly inflate and deploy downward. The deployment stability of the side airbag, thus, can further be improved.

In the fourth aspect of the invention, according to the third aspect, each end portion of the first and the second cover portions is sewn to the side airbag, and each of the other end portions includes a through hole which allows an insertion of a fixing member for fixing the inflator for supplying gas to the side airbag to the body of the vehicle.

In the fourth aspect of the invention, the fixing members are inserted into the through holes formed in the other ends of the first and the second cover portions to cover the side airbag with the side airbag cover. The use of the fixing member of the inflator for fixing the side airbag cover can make it unnecessary to provide an additional fixing member for fixing the first and the second cover portions of the side airbag cover, thus simplifying the fixing structure.

In the fifth aspect of the invention, according to any one of the first to the fourth aspects, the side airbag includes a first bag portion as the front inflation portion provided at an upper portion to restrain a movement of a shoulder of the occupant, and a second bag portion as the lower inflation portion provided at a lower portion to restrain a movement of a lower-back of the occupant. The first cover portion covers the first bag portion, and the second cover portion covers the second bag portion.

In the fifth aspect, the tear portion of the first cover portion is torn upon the inflation and deployment of the side airbag so as to allow the first bag portion of the side airbag to smoothly inflate and deploy forward. The tear portion of the second cover portion is torn so as to allow the second bag portion of the side airbag to smoothly inflate and deploy downward. This configuration makes it possible to quickly restrain the movement of the shoulder and the lower-back of the occupant, thus improving the safety.

In the sixth aspect of the invention, a side airbag apparatus includes a side airbag which inflates and deploys between a side wall portion of a body of a vehicle, and an occupant seated in a seat inside the body, the side airbag cover according to any one of the first to the fifth aspects for holding a folded shape of the side airbag so as to be stored, an inflator which supplies gas for inflating and deploying the side airbag, and a casing which stores the side airbag, the side airbag cover, and the inflator.

In the sixth aspect, the side airbag is covered with the side airbag cover in the folded state, and stored in the casing. When the inflator is activated in response to the side collision or rollover of the vehicle, the side airbag inflates and tears the airbag cover so as to deploy between the occupant and the side wall of the vehicle body.

In the sixth aspect, the side airbag cover includes the first cover portion for covering the front inflation portion of the side airbag, which inflates and deploys mainly forward in the longitudinal direction of the vehicle, and the second cover portion for covering the lower inflation portion of the side airbag, which inflates and deploys mainly downward. This configuration makes it possible to make the covered area smaller than that in the case where the side airbag is entirely covered with the side airbag cover. Therefore, it is possible to reduce the force required for tearing the airbag cover upon the inflation and deployment of the airbag, resulting in the improved deployment stability of the side airbag. As the covered area may be reduced, the amount of the base fabric required for forming the airbag cover may also be reduced. As a result, it becomes possible to reduce the package capacity in the state where the side airbag is covered with the side airbag cover.

According to the invention, the deployment stability of the side airbag can be improved, and the amount of the base fabric required for forming the cover can be reduced. Furthermore, this invention makes it possible to reduce the package capacity in the state where the side airbag is covered with the side airbag cover.

DETAILED DESCRIPTION OF PREFERRED EMBODIMENTS

Figure 1:
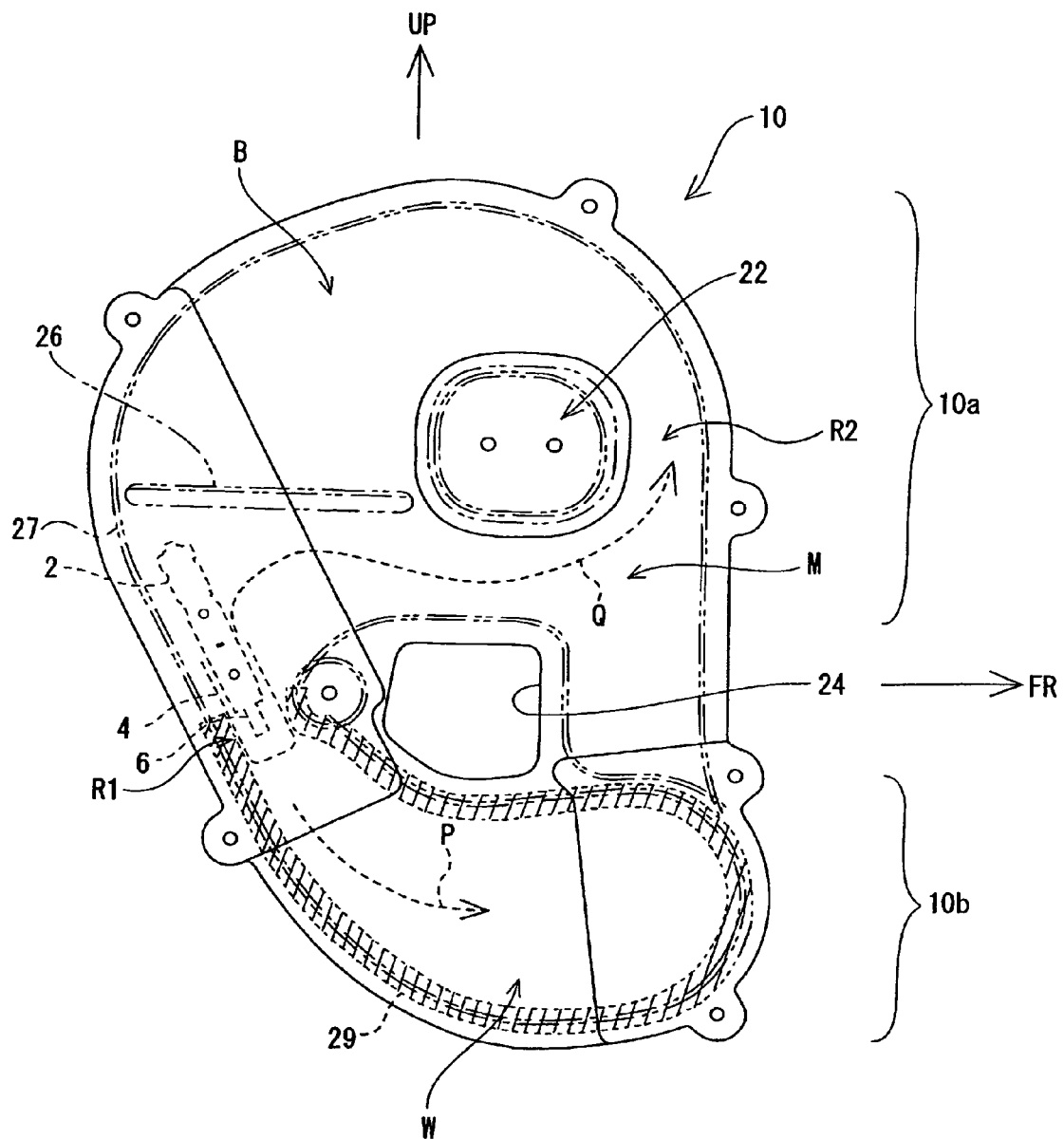
FIG. 1 is a development plan view of a side airbag according to an embodiment of the present invention.
Figure 2:
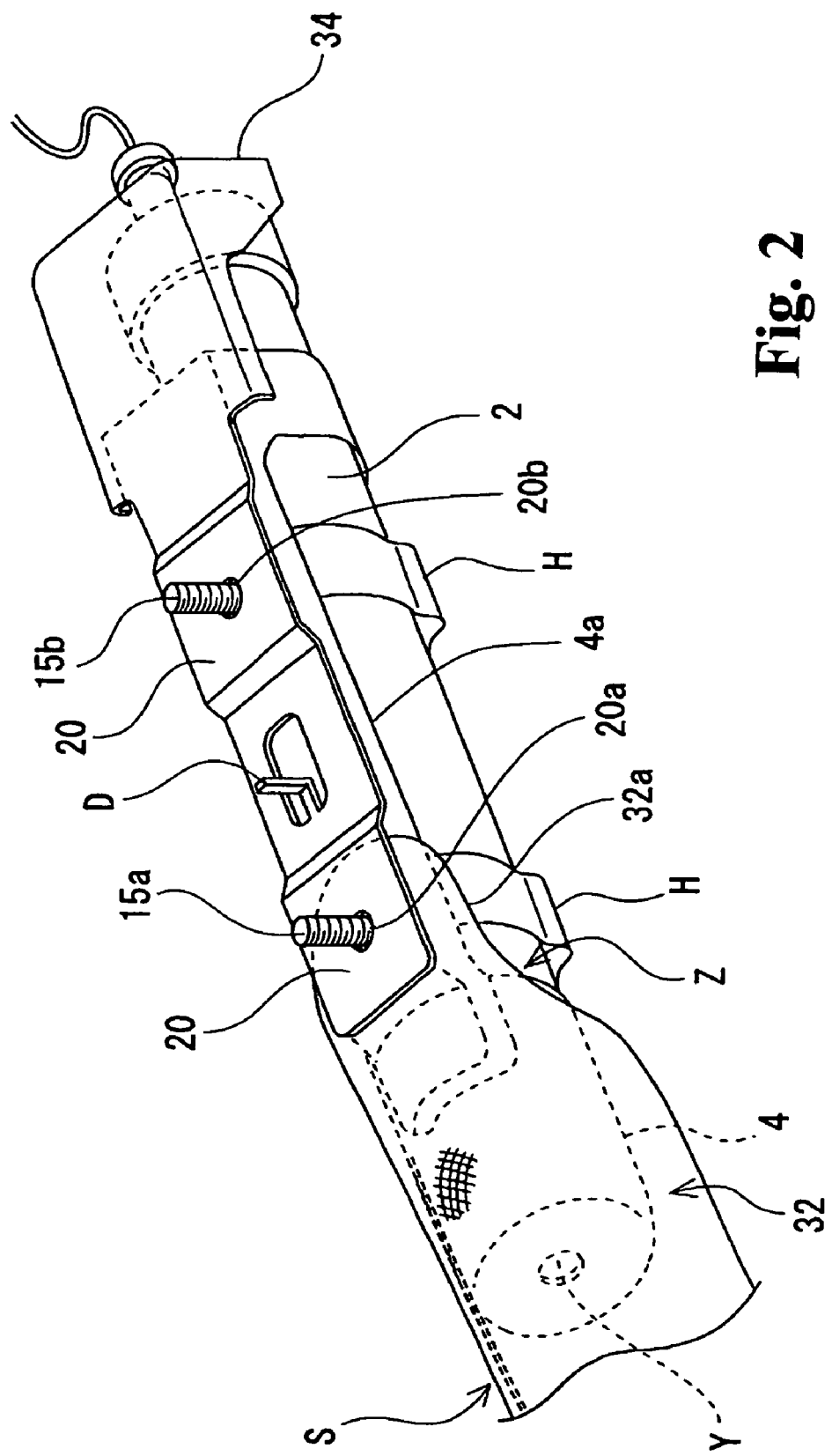
FIG. 2 is a perspective view showing an overall structure of an inflator which inflates and deploys the side airbag according to the embodiment.
Figure 3:
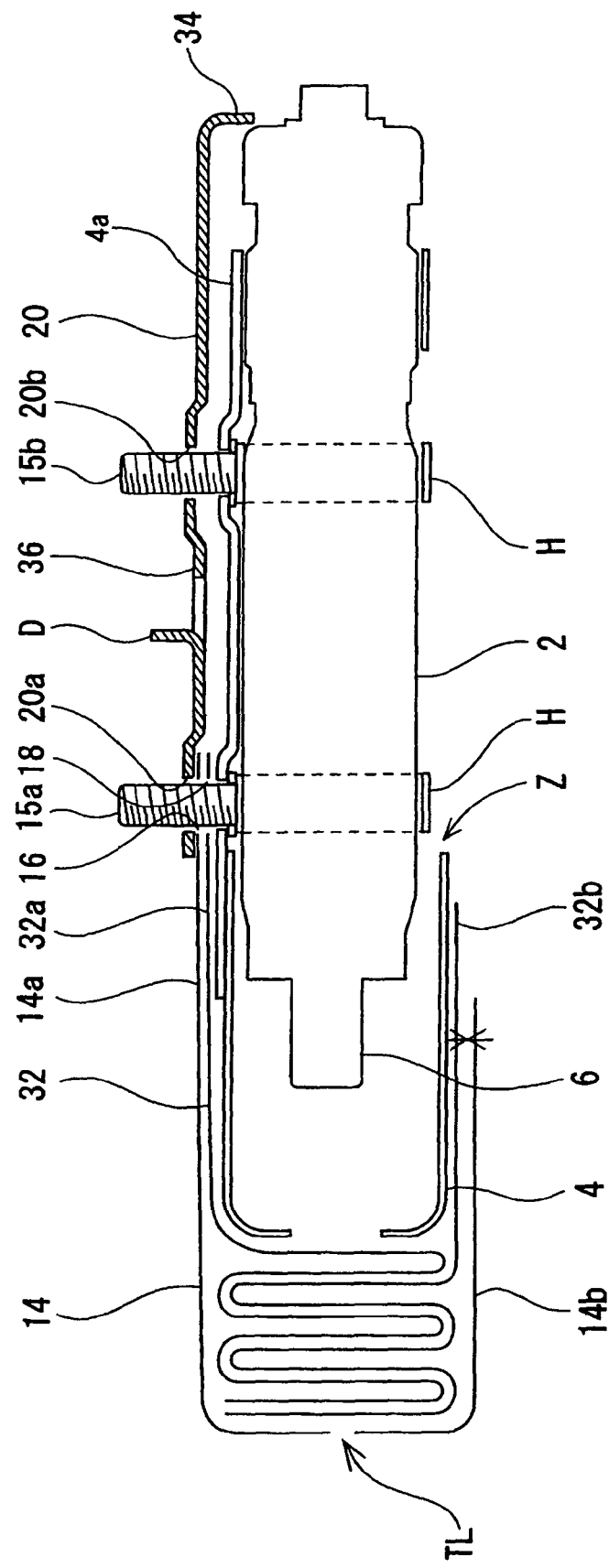
FIG. 3 is a sectional view showing the tubular base fabric member folded like bellows held around an ejection portion of the inflator with a shape holding cloth in an inactive state of the inflator.
Figure 4A:
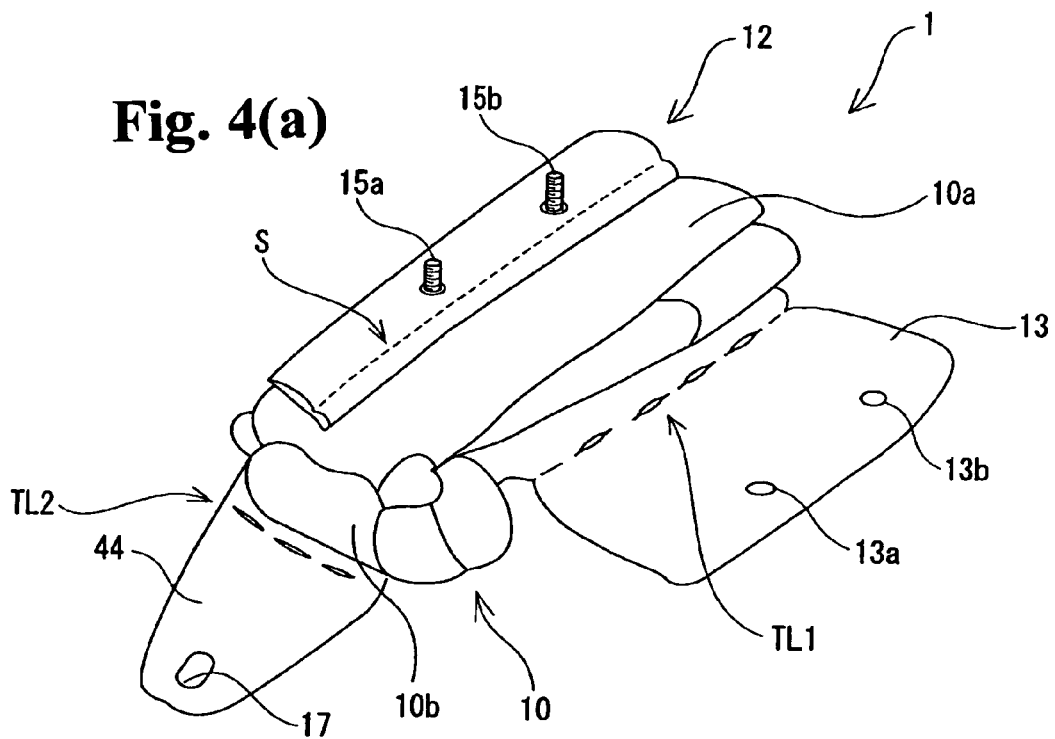
FIGS. 4(a), 4(b) are views each representing a side airbag cover when it is opened and closed, respectively.
Figure 4B:
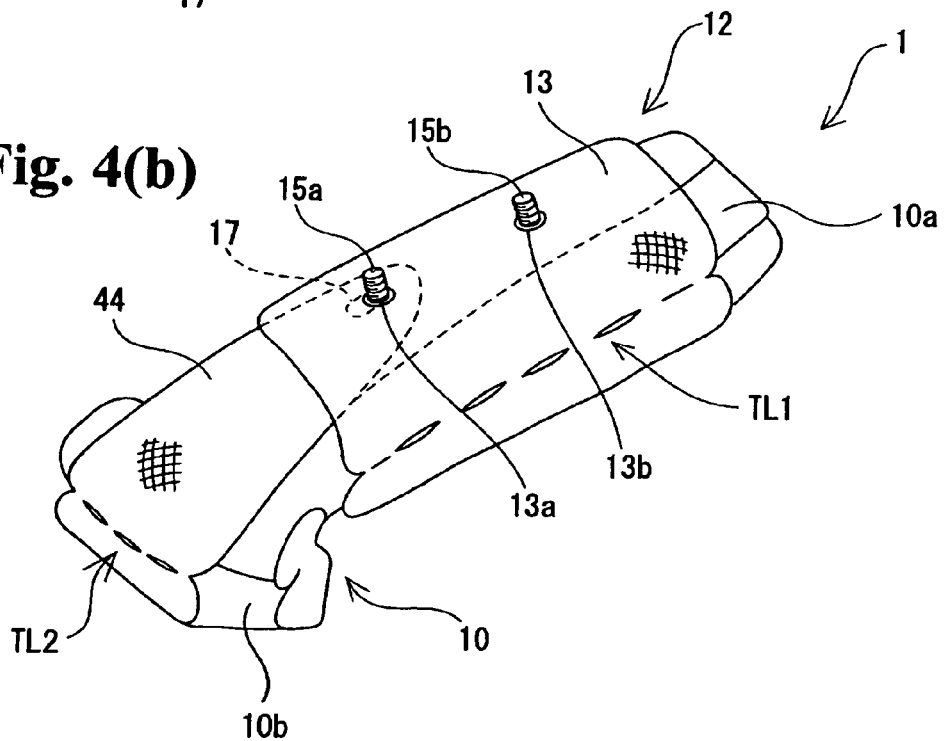

The present invention will be further illustrated with embodiments below. FIG. 1 is a development plan view of a side airbag according to the embodiment. FIG. 2 is an overall perspective view showing the inflator which inflates and deploys the side airbag. FIG. 3 is a sectional view representing the state where the tubular base fabric member folded like bellows is held with the shape holding cloth around the ejection portion of the inflator in an inactive state of the inflator. FIG. 4(a) is a perspective view showing the side airbag cover when it is opened. FIG. 4(b) is a perspective view showing the side airbag cover when it is closed. Referring to FIG. 1, an arrow FR denotes a forward direction of the vehicle, and an arrow UP denotes an upward direction of the vehicle. In FIGS. 4(a), 4(b), the protrusion portion to be described later is omitted.

A side airbag apparatus 1 includes a bag-like side airbag 10, an inflator 2 inserted in the side airbag 10 to supply gas for inflating and deploying the side airbag 10, a side airbag cover 12 (see FIGS. 4(a), 4(b)) for holding a folded shape of the side airbag 10 when it is stored in a casing (not shown), and the casing which stores the folded side airbag 10 covered with the side airbag cover 12.

Referring to FIG. 1, the side airbag 10 is formed into the bag by sewing substantially the same configured base fabrics along the respective outer edges over the whole circumference. A reference numeral 27 in FIG. 1 denotes a sewn portion with double stitches at a portion along the outer edge of the bag (the single stitch may be employed instead of the double stitch).

The side airbag 10 contains a first bag portion 10a (front inflation portion) which contains a chest chamber B at the upper portion for restraining a movement of the chest (including the shoulder) of the occupant, and inflates and deploys mainly forward of the vehicle, and a second bag portion 10b (lower inflation portion) which contains a lower-back chamber W at the lower portion for restraining the movement of the lower-back of the occupant, and inflates and deploys mainly downward of the vehicle. The first bag portion 10a includes an intermediate chamber M below the chest chamber B, which is disposed between the chambers W and B and defined by the chest chamber B, the tether cloth 26, and a non-inflation portion 22. The inflator 2 is installed in a communication passage R1 for communicating the intermediate chamber M with the lower-back chamber W such that a protrusion portion 6 is directed to the lower-back chamber W for ejecting the gas.

An opening 24 which pierces the airbag in a width direction of the vehicle (a vertical direction with respect to FIG. 1) is formed between the lower-back chamber W and the intermediate chamber W of the side airbag 10. In the aforementioned structure, when the inflator 2 is activated, the gas adjusted to a predetermined flow rate is fed into the lower-back chamber W from the protrusion portion 6 via a gas discharge hole Y (see FIG. 2) of a sleeve 4 (see arrow P with a dashed line shown in FIG. 1). Then, the gas adjusted at the predetermined flow rate is guided forward by the tether cloth 26 in the intermediate chamber M via a flow passage Z of the sleeve 4 (see FIG. 2) from the protrusion portion 6, and is fed into the chest chamber B through a communication passage R2 which communicates the intermediate chamber M with the chest chamber B (see arrow Q with a dashed line in FIG. 1).

The section of the sewn portion 27 for forming the outer edge of the lower-back chamber W is provided with a seal member 29 formed of an appropriate sealing member such as the silicon rubber along the stitched portion 27 so as to be sealed. The seal member 29 has a width wider than that of the double sewn portion 27 so as to be entirely sealed (see FIG. 1). This configuration makes it possible to improve an air-tightness of the lower-back chamber W, and to hold the pressure inside the lower-back chamber W for restraining the movement of the occupant's lower-back at the high pressure for an elongated period.

Referring to FIGS. 2 and 3, the tubular sleeve 4 is disposed at one side of the inflator 2 around the portion where the gas is ejected (left side in FIGS. 2 and 3) to cover the protrusion portion 6. A tubular base fabric member 32 is provided to further cover the sleeve 4. The tubular base fabric member 32 is held around the gas discharge hole Y in the bellows-like folded state with the shape holding cloth 14 as shown in FIG. 3.

The tubular sleeve 4 includes the gas discharge hole Y at its leading end at the protrusion portion 6 of the inflator 2. The flow rate of the gas ejected through the gas discharge hole Y is reduced to adjust the volume of gas flowing into the lower-back chamber W. The ejected gas with the volume corresponding to the one adjusted by the gas discharge hole Y is discharged through an annular gap Z formed between the outer circumference of the other end of the inflator 2 in the longitudinal direction and the opening edge of the sleeve 4 at the other end (right side shown in FIG. 2) having the diameter larger than that of the inflator 2, and the gas is further fed into the intermediate chamber M. In this stage, the outer circumferential surface of the sleeve 4 and the seal member 29 at the communication passage R1 are substantially sealed so as not to allow the leakage of the ejection gas from the space therebetween (see FIG. 1). The flow rate of the gas flowing from the inflator 2 to the lower-back chamber W and the intermediate chamber M (chest chamber B) is distributed at the appropriate ratio.

The tubular base fabric member 32 is formed into substantially a tubular shape by sewing the opposite side of edges of the flat base fabrics at the stitch portion S, serving as a check valve to prevent the inverse flow of the gas from the lower-back chamber W to the intermediate chamber M upon the deployment of the airbag. The tubular base fabric member 32 is provided with a fixing piece 32a which extends along the longitudinal direction of the inflator 2 at the other end (right side shown in FIGS. 2 and 3). The fixing piece 32a includes a lock hole 18 (see FIG. 3). A bolt 15a at the ejection side of a pair of bolts 15a and 15b for corresponding support members H arranged at the front and the rear sides of the inflator 2 is inserted and fixed through the lock hole 18. In the aforementioned state, the bolt 15a is inserted in a fixing hole 20a such that a stopper plate 20 is layered. The fixing piece 32a of the tubular base fabric member 32 is interposed between a support portion 4a of the sleeve 4 and the stopper plate 20.

The shape holding cloth 14 is a belt-like base fabric having an end 14b sewn to an end 32b of the tubular base fabric member 32, and a lock hole 16 formed in the other end 14a allows the bolt 15a to be inserted and fixed at the ejection side of the bolts 15a, 15b for corresponding support members H arranged at the front and rear sides of the inflator 2. A tear line TL is formed in a substantially intermediate portion of the shape holding cloth 14 in the lateral direction. In response to the activation of the inflator, the shape holding cloth 14 tears the tear line Tl so as to allow the deployment of the tubular foundation fabric member 32.

The stopper plate 20 includes a restriction portion 34 formed by bending at the side opposite to the ejection side of the inflator 2 to cover a portion of the end thereof, two bolt insertion holes 20a, 20b formed at the positions corresponding to the bolts 15a and 15b, and a protrusion D formed by bending the cut portion upward at the intermediate position between those insertion portions 20a and 20b.

The restriction portion 34 of the stopper plate 20 prevents the inflator 2 from moving in the direction opposite to the gas ejection direction at the reaction of the ejection of gas. The protrusion D is used for externally confirming the storage of the folded side airbag 10 in the casing C via the hole (not shown) so as not to miss the installation of the stopper plate 20.

The side airbag cover 12 is used for holding the folded shape of the side airbag 10 so as to be stored. Referring to FIGS. 4(a), 4(b), the side airbag cover 12 includes a first cover portion 13 for covering the first bag portion 10a of the side airbag 10, which inflates and deploys mainly forward in the longitudinal direction of the vehicle, and a second cover portion 44 for covering the second bag portion 10b of the side airbag 10, which inflates and deploys mainly downward. The first cover portion 13 includes a tear line TL1 (tear portion) which is torn upon inflation and deployment of the side airbag 10 at the front end (right lower end shown in FIG. 4(a), 4(b)) of the vehicle in the state where the first bag 10a is covered. Likewise, the second cover portion 44 includes a tear line TL2 (tear portion) which is torn upon the inflation and deployment of the side airbag 10 at the lower end (left lower end shown in FIG. 4(a), 4(b)) in the state where the second bag 10b is covered.

Each one end of the first and the second cover portions 13 and 44 is sewn to the side airbag 10. Each of the other ends includes through holes 13a, 13b and 17 which allow insertions of the bolts 15a, 15b as the fixing members for fixing the inflator 2 for supplying gas to the side airbag 10 to the body of the vehicle. The bolts 15a and 15b are inserted into the through holes 13a, 13b formed in the other end of the first cover portion 13, and the bolt 15a is inserted into the through hole 17 formed in the other end of the second cover portion 44 for covering the side airbag 10 with the side airbag cover 12.

The operation and effect of the above-structured embodiment will be described. Generally, the side airbag 10 is folded to be stored in the casing built in the back portion of the seat. The airbag 10 in the folded state is covered with the side airbag cover 12 to be stored in the casing while holding the folded shape.

In the embodiment, the side airbag cover 12 includes the first cover portion 13 for covering the first bag portion 10a of the side airbag 10, which inflates and deploys mainly forward of the vehicle, and the second cover portion 44 for covering the second bag portion 10b of the side airbag 10, which inflates and deploys mainly downward. This configuration makes it possible to make the covered area of the side airbag smaller than that in a case where it covers the side airbag 10 entirely with the side airbag cover 12. The force required for tearing the airbag cover 12 upon inflation and deployment of the airbag may be reduced, thus improving the deployment stability of the side airbag 10. The covered area can be reduced to further reduce the amount of the base fabric required for forming the airbag cover 12. Therefore, it is further possible to reduce the package capacity in the state where the side airbag 10 is covered with the side airbag cover 12.

In the example, the first and the second cover portions 13 and 44 include the tear lines TL1 and TL2, respectively, which are torn upon inflation and deployment of the side airbag 10. Upon inflation and deployment of the side airbag 10, the tear line TL1 of the first cover portion 13 is torn such that the first bag portion 10a smoothly inflates and deploys forward, and the tear line TL2 of the second cover portion 44 is torn such that the second bag portion 10b smoothly inflates and deploys downward. This configuration makes it possible to further improve the deployment stability of the side airbag 10.

In the embodiment, the first cover portion 13 includes the tear line TL1 at the front end of the vehicle in the state where the first bag portion 10a is covered, and the second cover portion 44 includes the tear line TL2 at the lower end in the state where the second bag portion 10b is covered. Upon the inflation and deployment of the airbag 10, the tear line TL1 of the first cover portion 13 formed at the front end of the vehicle is torn to allow the first bag portion 10a to smoothly inflate and deploy forward, and the tear line TL2 of the second cover portion 44 formed at the lower end is torn to allow the second bag portion 10b to smoothly inflate and deploy downward. Therefore, it is possible to further improve the deployment stability of the side airbag 10.

In the example, each one end of the first and the second cover portions 13 and 44 is sewn to the side airbag 10, and each of the other ends has the through holes 13a, 13b and 17 which allow insertions of the bolts 15a and 15b for fixing the inflator 2 to the vehicle body. The bolts 15a and 15b are inserted into the through holes 13a, 13b and 17 formed in the other ends of the first and the second cover portions 13a and 44 to cover the side airbag 10 with the side airbag cover 12. The use of the bolts 15a and 15b as the fixing members of the inflator 2 for fixing the side airbag cover 12 can eliminate a necessity of the additional fixing member for fixing the first and the second cover portions 13 and 44 of the side airbag cover 12, thus simplifying the structure for fixing the cover.

In the aforementioned example, the side airbag 10 includes a plurality of chambers (the chest chamber B, the lower-back chamber W, and the intermediate chamber M). The present invention is not limited to the aforementioned structure. It may be applied to the airbag formed of the single chamber or any other airbag so long as it has the front inflation portion which inflates and deploys mainly forward of the vehicle, and the lower inflation portion which inflates and deploys mainly downward.

The disclosure of Japanese Patent Application No. 2007-243410, filed on Sep. 20, 2007, is incorporated in the application.

While the invention has been explained with reference to the specific embodiments of the invention, the explanation is illustrative and the invention is limited only by the appended claims.

What is claimed is:

1. A side airbag apparatus, comprising:
   an inflator for supplying gas,
   a side airbag connected to the inflator to be inflated and deployed between a side wall portion of a vehicle and an occupant seated in a seat inside the vehicle, the side airbag having a front inflation portion inflating and deploying substantially forward in a longitudinal direction of the vehicle and a lower inflation portion inflating and deploying substantially downward,
   a fixing member to fix the inflator and the side airbag to the seat, and having a bolt, and
   a side airbag cover for covering and holding a folded side airbag so as to be stored, the side airbag cover being sewed to the side airbag and comprising:
   a first cover portion for covering the front inflation portion of the side airbag and having a first hole,
   a second cover portion separated from the first cover portion and extending perpendicular to the first cover portion for covering the lower inflation portion of the side airbag, the second cover portion having a second hole, and
   a base integrally formed with the first and second cover portions for covering the folded side airbag together with the first and second cover portions and having a third hole, the first, second and third holes being arranged to engage the bolt to hold the folded side airbag, wherein
   said first and second cover portions include tear portions for tearing upon inflation and deployment of the side airbag.

2. A side airbag apparatus according to claim 1, wherein the first cover portion includes a first tear portion at a front end portion thereof in the longitudinal direction of the vehicle in a state where the front inflation portion is covered; and the second cover portion includes a second tear portion at a lower end portion thereof in a state where the lower inflation portion is covered.

3. A side airbag apparatus according to claim 1, further comprising
   a casing for storing the side airbag, the side airbag cover, and the inflator.

4. A side airbag apparatus according to claim 3, wherein the side airbag includes a first bag portion as a front inflation portion provided at an upper portion to restrain a shoulder of the occupant, and a second bag portion as a lower inflation portion provided at a lower portion to restrain a lower-back of the occupant, and wherein the first cover portion covers the first bag portion, and the second cover portion covers the second bag portion.

5. A side airbag apparatus according to claim 1, wherein said side airbag cover consists of said base, said first cover portion and said second cover portion, and covers front, back two sides and bottom portions of the folded side airbag without covering an upper portion of the folded side airbag.

* * * * *